(12) United States Patent
Hashimoto

(10) Patent No.: US 6,876,391 B1
(45) Date of Patent: Apr. 5, 2005

(54) IMAGING DEVICE AND CONTROL METHOD THEREOF

(75) Inventor: Hitoshi Hashimoto, Sagamihara (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/519,031

(22) Filed: Mar. 3, 2000

(30) Foreign Application Priority Data

Mar. 5, 1999 (JP) ............................................. 11-058530
Feb. 29, 2000 (JP) ....................................... 2000-053671

(51) Int. Cl.$^7$ .......................... H04N 5/232; H04N 5/228
(52) U.S. Cl. ..................... 348/345; 348/354; 348/222.1
(58) Field of Search ............................... 348/354, 355, 348/348, 349, 345, 222.1; 396/96, 121, 125

(56) References Cited

U.S. PATENT DOCUMENTS

| | | | | |
|---|---|---|---|---|
| 5,031,048 A | * | 7/1991 | Naruto et al. ................ | 348/296 |
| 5,497,215 A | * | 3/1996 | Iwasaki ........................ | 396/225 |
| 5,500,675 A | * | 3/1996 | Arakawa et al. ............. | 348/319 |
| 5,541,654 A | * | 7/1996 | Roberts ........................ | 348/301 |
| 5,600,127 A | * | 2/1997 | Kimata ......................... | 250/208.1 |
| 5,615,399 A | * | 3/1997 | Akashi et al. ................ | 396/128 |
| 5,943,514 A | * | 8/1999 | Sato et al. .................... | 396/96 |
| 6,075,562 A | * | 6/2000 | Sakaguchi et al. .......... | 348/223.1 |
| 6,278,490 B1 | * | 8/2001 | Fukuda et al. ............... | 348/362 |
| 6,327,436 B2 | * | 12/2001 | Kawabe et al. .............. | 396/121 |
| 6,587,149 B1 | * | 7/2003 | Yoneyama et al. .......... | 348/362 |
| 2001/0038418 A1 | * | 11/2001 | Suda et al. ................... | 348/347 |

OTHER PUBLICATIONS

Office Action issued by Japanese Patent Office on Jan. 7, 2003 and English translation thereof.
Japanese Laid Open Publication No. 5–316432 dated Nov. 26, 1993 *English translation not available.*
Japanese Laid Open Publication No. 10–136244 dated May 22, 1998 *English translation not available.*
Japanese Laid Open Publication No. 5–007333 dated Jan. 14, 1993 *English translation not available.*

* cited by examiner

*Primary Examiner*—Andrew Christensen
*Assistant Examiner*—Lin Ye
(74) *Attorney, Agent, or Firm*—Ostrolenk, Faber, Gerb, & Soffen, LLP

(57) ABSTRACT

In an electronic still camera where the signal charges accumulated corresponding to the image of a subject formed by an imaging optical system 1 are read from a CCD and displayed on an LCD via an imaging circuit, an A/D converter, a buffer memory, and a D/A converter, or recorded on a recording memory via a compression/expansion circuit, the photoelectric conversion elements of the CCD are divided into groups composed of combinations of lines spaced at specific intervals, charge accumulation start timing is controlled in such a manner that the elements belonging to the same group start to accumulate charges with the same timing and the elements belonging to another group start to accumulate charges with different timing, an AF processing section finds an in-focus position from the image signal read from each of the photoelectric conversion element groups in the CCD 5, and on the basis of the in-focus position, a focus lens group is driven.

10 Claims, 5 Drawing Sheets

IMAGING DEVICE AND CONTROL METHOD THEREOF

CROSS-REFERENCE TO RELATED APPLICATIONS

This application is based upon and claims the benefit of priority from the Japanese Patent Applications No. 11-058530, filed Mar. 5, 1999; and No. 2000-053671, filed Feb. 29, 2000, the entire contents of which are incorporated herein by reference.

BACKGROUND OF THE INVENTION

This invention relates to an electronic imaging device that uses a solid-state imaging device, such as a CCD two-dimensional image sensor, to pick up images, and an electronic imaging device control method, and more particularly to an automatic focusing system capable of high-speed operation.

More and more electronic imaging devices, such as electronic still cameras, are being used these days. In the electronic imaging devices, the imaging optical system forms an image of the subject on a solid-state imaging device, such as a CCD two-dimensional image sensor, which converts the image into an electric signal to produce an image signal. The image signal is recorded on a recording medium, such as a semiconductor memory or a magnetic disk.

Such an electronic still camera is provided with an autofocus (AF) system which generally senses focal errors in the focus lens of the imaging optical system and adjusts the focal point automatically by moving the focus lens along the optical axis on the basis of information on the focal error. One known AF system for the electronic still camera is an imager AF system for sensing focal errors on the basis of the contrast of the subject picked up by an imaging device and judging the in-focus position.

More specifically, in the imager AF system, while the focus lens is being moved stepwise along the optical axis, the high-frequency components are extracted by a high-pass filter from the image signal obtained from the imaging device. The reason is that the contrast of the subject becomes the highest when the focal point has been adjusted correctly and simultaneously the high-frequency components of the image signals become the largest. Then, the amount of high frequency components corresponding to each position of the focus lens, such as accumulative add value of the high-frequency components, is compared with each other. The highest contrast point at which the amount of high frequency components peaks is determined to be the in-focus point. The focus lens group is then moved to the in-focus point. This AF system is called a so-called mountain-climbing system. Such a conventional AF system has been disclosed in, for example, Jpn. Pat. Appln. KOKAI Publication No. 9-168113 or Jpn. Pat. Appln. KOKAI Publication No. 9-200597.

The conventional AF system, however, has the following problem: one screen (one frame or one field) of image signals is needed for each focus lens position to sense focal errors at more than one focus lens position and judge the in-focus position and therefore the AF operation requires a long time.

For example, when the focus lens position is set at 24 steps, it is necessary for the imaging device to pick up 24 screens of image signals for AF and therefore the time required for the AF operation amounts to a 24 frame period or a 24 field period. Thus, it is impossible to follow a subject moving at high speed. Decreasing the number of steps at the focus lens position shortens the time required for an AF operation, but the AF accuracy decreases accordingly.

As described above, in the AF system in the conventional electronic still camera, one screen of image signals is needed for each focus lens position to sense focal errors and judge the in-focus position, which makes a high-speed AF operation impossible. In addition, when the number of steps at the focus lens position is decreased to speed up an AF operation, this causes another problem of decreasing the accuracy of the AF operation.

BRIEF SUMMARY OF THE INVENTION

It is an object of the present invention to provide an imaging apparatus and an imaging apparatus control method which enable focal errors corresponding to lens positions to be sensed from a screen of signal images and the in-focus position to be determined, thereby achieving automatic focusing at high speed with high accuracy.

An imaging apparatus according to the present invention is characterized by comprising: a taking lens for forming an image of a subject on an imaging surface; an imaging device which is constructed by arranging photoelectric conversion elements in a two-dimensional array and dividing them into photoelectric conversion element groups composed of combinations of lines spaced at specific intervals and which stores the charges corresponding to the image of the subject formed by the taking lens on the imaging surface; control means for controlling the charge storage start timing for the imaging device in such a manner that the photoelectric conversion elements belonging to the same photoelectric conversion element group in the imaging device start to store charges with the same timing and the photoelectric conversion elements belonging to another photoelectric conversion element group start to store charges with different timing; and driving means for driving the taking lens along the optical axis on the basis of the image signal read from each of the photoelectric conversion element groups in the imaging device.

As described above, with the present invention, because the signal charges stored with different timing in the photoelectric conversion element groups into which the imaging device has been divided are read as image signals, the storage operation of signal charges in each of the photoelectric conversion elements is carried out, while the taking lens is being moved along the optical axis. This enables focal error information on the taking lens at different positions to be obtained on the basis of the image signals read from each of the photoelectric conversion groups. On the basis of the focal error information, the in-focus position can be determined.

Specifically, the in-focus position can be determined from a screen of image signals obtained through one image pickup by the imaging device. Moving the taking lens to the in-focus position enables high-speed AF (automatic focusing) operation. Because there is no need to decrease the number of steps of taking lens positions to speed up the AF operation, the accuracy of AF operation is assured.

Preferable modifications of the imaging apparatus according to the present invention are as follows:

(1) It is desirable that the driving means. should drive the taking lens to specific positions in synchronization with the charge storage start timing for each of the photoelectric conversion element groups in the imaging device.

(2) It is desirable that the driving means should compare the high-frequency components of the image signals read from each of the photoelectric conversion element groups at each position of the taking lens, judge an in-focus position on the basis of the result of the comparison, and drive the taking lens to the in-focus position.

Doing this causes the charge storage time to correspond to the position of the taking lens, enabling the in-focus position to be determined more accurately from the image signal, which improves the accuracy of AF operation more.

(3) It is desirable that the driving means should set any one of the positions of the lens driven by the driving means with the timing synchronizing with the charge storage start timing for each of the photoelectric conversion element groups as the in-focus position and drive the taking lens to the in-focus position.

With such a configuration, the in-focus position is determined easily by a smaller number of calculations than when candidates for the in-focus position including positions other than the lens positions are set. This enables the taking lens to be moved to the in-focus position at high speed.

(4) The imaging device includes, for example, the photoelectric conversion elements, a vertical transfer section for transferring the charges stored in the photoelectric conversion elements vertically, a horizontal transfer section for transferring the charges from the vertical transfer section horizontally, and transfer gates provided between the photoelectric conversion elements and the vertical transfer section in such a manner that they correspond to the photoelectric conversion elements on a one-to-one basis to transfer the charges stored in the photoelectric conversion elements to the vertical transfer section. It is desirable that the transfer gates should transfer the charges stored in the photoelectric conversion elements to the vertical transfer section, when transfer pulses are applied to the transfer gates at specific intervals of time over a specific time beginning at the charge storage start of the photoelectric conversion elements.

As described above, when the transfer gates are provided so as to correspond to the photoelectric conversion elements on a one-to-one basis, the timing of applying transfer pulses to the transfer gates is made different from one photoelectric conversion element group to another, which causes the charge storage timing for each of the photoelectric conversion element groups to differ from each other.

(5) Furthermore, it is desirable that the period during which the transfer pulses are applied to the transfer gates should be varied in the imaging device according to the brightness of the subject.

For example, when the subject is bright, the transfer pulse applying period is shortened, whereas when the subject is dark, the transfer pulse applying period is lengthened. This produces an image signal at the proper level, regardless of the brightness of the subject, which enables a good AF operation, regardless of the brightness of the subject.

An imaging apparatus control method according to the present invention is characterized by comprising: the step of causing a taking lens to form an image of a subject on an imaging surface; the step of storing the charges corresponding to the image of the subject formed by the taking lens on the imaging surface in such a manner that, in an imaging device which is constructed by arranging photoelectric conversion elements in a two-dimensional array and dividing them into photoelectric conversion element groups, the photoelectric conversion elements belonging to the same group start to store charges with the same timing and the photoelectric conversion elements belonging to another group start to store charges with different timing; and the step of driving the taking lens along the optical axis on the basis of the image signal read from each of the photoelectric conversion element groups.

As described above, with the present invention, because the signal charges stored with different timing in the photoelectric conversion element groups into which the imaging device has been divided are read as image signals, the storage operation of signal charges in each of the photoelectric conversion elements is carried out, while the taking lens is being moved along the optical axis. This enables focal error information on the taking lens at different positions to be obtained on the basis of the image signals read from each of the photoelectric conversion groups. On the basis of the focal error information, the in-focus position can be determined.

Specifically, the in-focus position can be determined from a screen of image signals obtained through one image pickup by the imaging device. Moving the taking lens to the in-focus position enables high-speed AF (automatic focusing) operation. Because there is no need to decrease the number of steps of taking lens positions to speed up the AF operation, the accuracy of AF operation is assured.

Preferable modifications of the imaging apparatus control method according to the present invention are as follows:

(1) It is desirable that the driving step should drive the taking lens to specific positions in synchronization with the charge storage start timing for each of the photoelectric conversion element groups.

(2) It is desirable that the driving step should drive not only the taking lens to specific positions in synchronization with the charge storage start timing for each of the photoelectric conversion element groups but also the taking lens to an in-focus position on the basis of the result of comparing the high-frequency components of the image signals read from each of the photoelectric conversion element groups after the storage.

(3) It is desirable that, in the driving step, the in-focus position should be any one of the specific positions.

(4) It is desirable that the step of storing the charges corresponding to the image of the subject formed by the taking lens on the imaging surface should include the step of storing charges in the photoelectric conversion elements, the step of causing transfer gates to transfer the charges stored in the photoelectric conversion elements to a vertical transfer section, when transfer pulses are applied to the transfer gates at specific intervals of time over a specific time beginning at the charge storage start of the photoelectric conversion elements, the step of causing a vertical transfer section to transfer the transferred charges vertically to a horizontal transfer section, and the step of transferring the charges from the vertical transfer section horizontally.

As described above, when the transfer gates are provided so as to correspond to the photoelectric conversion elements on a one-to-one basis, the timing of applying transfer pulses to the transfer gates is made different from one photoelectric conversion element group to another, which causes the charge storage timing for each of the photoelectric conversion element groups to differ from each other.

(5) Furthermore, it is desirable that the step of transferring charges to the vertical transfer section should change, according to the brightness of the subject, the specific time during which the transfer pulses are applied.

For example, when the subject is bright, the transfer pulse applying period is shortened, whereas when the subject is dark, the transfer pulse applying period is lengthened. This produces an image signal at the proper level, regardless of the brightness of the subject, which enables a good AF operation, regardless of the brightness of the subject.

As described above, with the present invention, the photoelectric conversion elements of the imaging device are divided into groups composed of combinations of lines spaced at specific intervals. The charge storage start timing is controlled in such a manner that the photoelectric conversion elements belonging to the same group start to store charges with the same timing and the photoelectric conversions belonging to another group start to store charges with different timing. On the basis of the image signal read from each of the photoelectric conversion element groups, the in-focus position can be determined from one image pickup by the imaging device. The taking lens is then moved to the in-focus position, thereby achieving a high-speed AF operation, while maintaining the accuracy of the AF operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring the accompanying drawings, an embodiment of the present invention will be explained.

Figure 1:
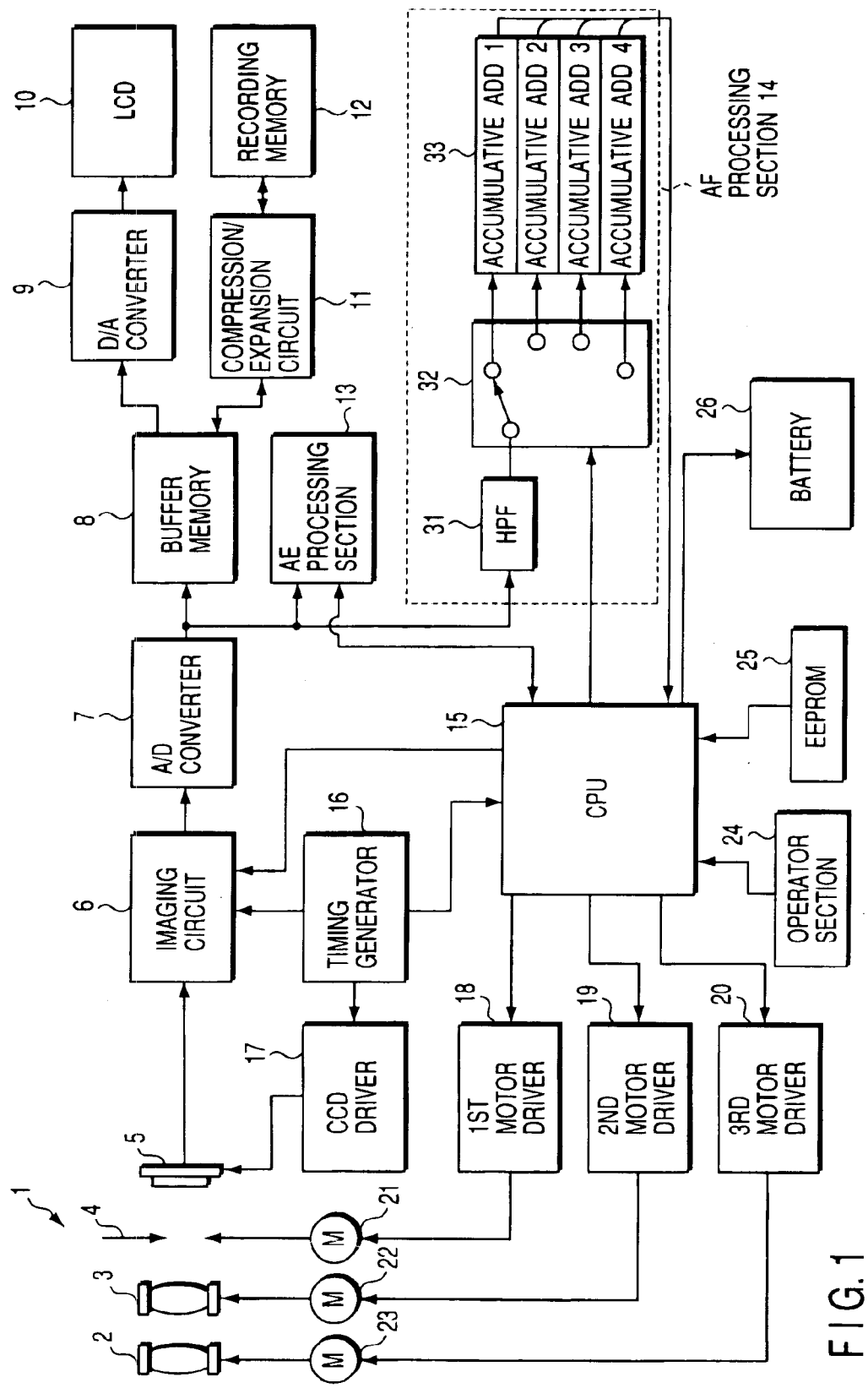
FIG. 1 is a block diagram showing the configuration an electronic imaging device according to an embodiment of the present invention.

FIG. 1 is a block diagram showing the configuration an electronic imaging device according to an embodiment of the present invention. In FIG. 1, the light from a subject passes through a zoom lens group 2 and a focus lens group 3 acting as a taking lens both constituting an imaging optical system 1 provided a lens body tube (not shown) and then strikes a solid-state imaging device, such as a CCD two-dimensional image sensor (hereinafter, referred to as a CCD) 5 via a diaphragm 4 serving as amount-of-light adjusting means. As a result, an image of the subject is formed on the imaging surface of the CCD 5.

The CCD 5 is such that photoelectric conversion elements called pixels are arranged in a two-dimensional matrix to form an imaging surface, on which a color filter is placed. The CCD 5 is driven by a CCD driver 17 and accumulates the signal charges corresponding to the image of the subject that the light from the subject passed through the imaging optical system 1 and diaphragm 4 has formed on the imaging surface. The signal charges accumulated in the CCD 5 are read as an electric signal called a pixel signal, which is inputted to an imaging circuit 6. The imaging circuit 6 performs CDS (correlated double sampling), AGC (automatic gain control), and other controls on the signal, thereby producing an image signal in a specific format.

The image signal produced at the imaging circuit 6 is converted by an A/D converter 7 into a digital signal and then is stored in a buffer memory 8 temporarily. The image signal read from the buffer memory 8 is returned by a D/A converter 9 into an analog signal. The analog signal is further converted into a signal whose form is suitable for reproduction output and then is supplied to an LCD (liquid-crystal display) 10, which displays it as an image.

A compression/expansion circuit 11 is also connected to the buffer memory 8. A recording memory 12 acting as a recording medium for recording image data and related data is connected to the compression/expansion circuit 11

The compression/expansion circuit 11 is composed of a compression circuit section and an expansion circuit section. The compression circuit section reads the image signal stored in the buffer memory 8 and compresses (encodes) the signal, thereby converting the signal into a signal in a form suitable for recording on the recording memory 12. The expansion circuit section reads the image signal stored in the recording memory 12 and expands (decodes) the signal, thereby converting the signal into a signal in a form suitable for reproduction output, such as display or printing.

The recording memory 12 may be composed of a solid-state semiconductor memory, such as a flash memory, or a card-type flash memory that is shaped like a card or a stick and can be attached to or removed from the device. In addition, it may be composed of a magnetic recording medium, such as a hard disk or a floppy disk.

The image signal outputted from the AID converter 7 is supplied to an AE processing section 13 and an AF processing section 14. The AE processing section 13 receives the image signal outputted from the A/D converter 7 and executes an arithmetic operation centering on accumulative addition of the pixel signal from each pixel. The AE processing section 13 then calculates an AE evaluation value (photometric quantity) corresponding to the brightness of the subject on the basis of the accumulative add value and then executes the automatic exposure (AE) process of adjusting the exposure automatically using a CPU 15 on the basis of the AE evaluation value.

The AF processing section 14 receives the image signal outputted from the A/D converter 7 and causes a high-pass filter 31 to extract the high-frequency component from the image signal. Then, the AF processing section 14 calculates the AF evaluation value corresponding to the amount of outline component of the subject image by performing the accumulative add process on the high-frequency component and thereafter executes the automatic focusing (AF) process using the CPU 15 on the basis of the AF evaluation value.

In the electronic imaging device of FIG. 1, an example of the AF processing section 14 composed of the high-pass filter 31, a switching device 32, and a accumulative add section 33 is shown. A detailed operation of the AF processing section will be explained later.

The CPU 15 supervises control of the entire imaging device. For example, connected to the CPU 15 are not only the AE processing section 13 and AF processing section 14 but also a timing generator 16, a first motor driver 18, a second motor driver 19, a third motor driver 20, an operator section 24, an EEPROM 25, and a battery 26. The timing generator 16 generates various types of timing signals to be supplied to the CPU 15, CCD driver 17, and imaging circuit 6.

The first motor driver 18 controls a diaphragm driving motor 21 for driving the diaphragm 4. The CPU 15 controls the first motor driver 18 on the basis of the AE evaluation value calculated at the AE processing circuit 13, thereby adjusting the amount of closing of the diaphragm 4 so as to obtain the right exposure.

The second motor driver 19 controls the focus motor 22 for driving the focus lens group 3. The CPU 15 controls the second motor driver 19 on the basis of the AF evaluation value calculated at the AF computing circuit 14, thereby performing AF control in which the focus lens group 3 is moved along the optical axis so as to achieve the in-focus state.

The third motor driver 20 controls a zoom motor 23 for driving the zoom lens group 2. When the zoom switch in the operator section 24 explained later is operated, the CPU 15 controls the third motor driver 20 according to the instruction signal from the zoom switch, thereby performing zoom control in which the zoom lens group 2 is moved along the optical axis so as to accomplish the desired variable power operation.

The operator section 24 is composed of operator switches that generate instruction signals to instruct various types of operations and send the signals to the CPU 15. Specifically, the operator section 24 includes, for example, a main power switch for generating instruction signals to start up the imaging device and instruct power supply, a release switch for generating instruction signals to start an image pickup/recording operation, a playback switch for generating instruction signals to start a playback operation, and a zoom switch (zoom-in switch and zoom-out switch) for generating instruction signals to start a variable power operation by moving the zoom lens group 2.

The release switch is composed of a first-stage release switch for generating instruction signals to start the AE process and AF process before an image pickup operation, and a second-stage release switch for receiving the instruction signal generated by the first-stage release switch and generating instruction signals to start an actual image pickup operation.

The EEPROM 25 is an electrically rewritable memory and stores in advance various types of control programs and the data used to carry out various operations.

The battery 26, which is controlled by the CPU 15, supplies electric power to each section of the imaging device.

Hereinafter, the AF system in the embodiment will be explained in detail.

Figure 2:
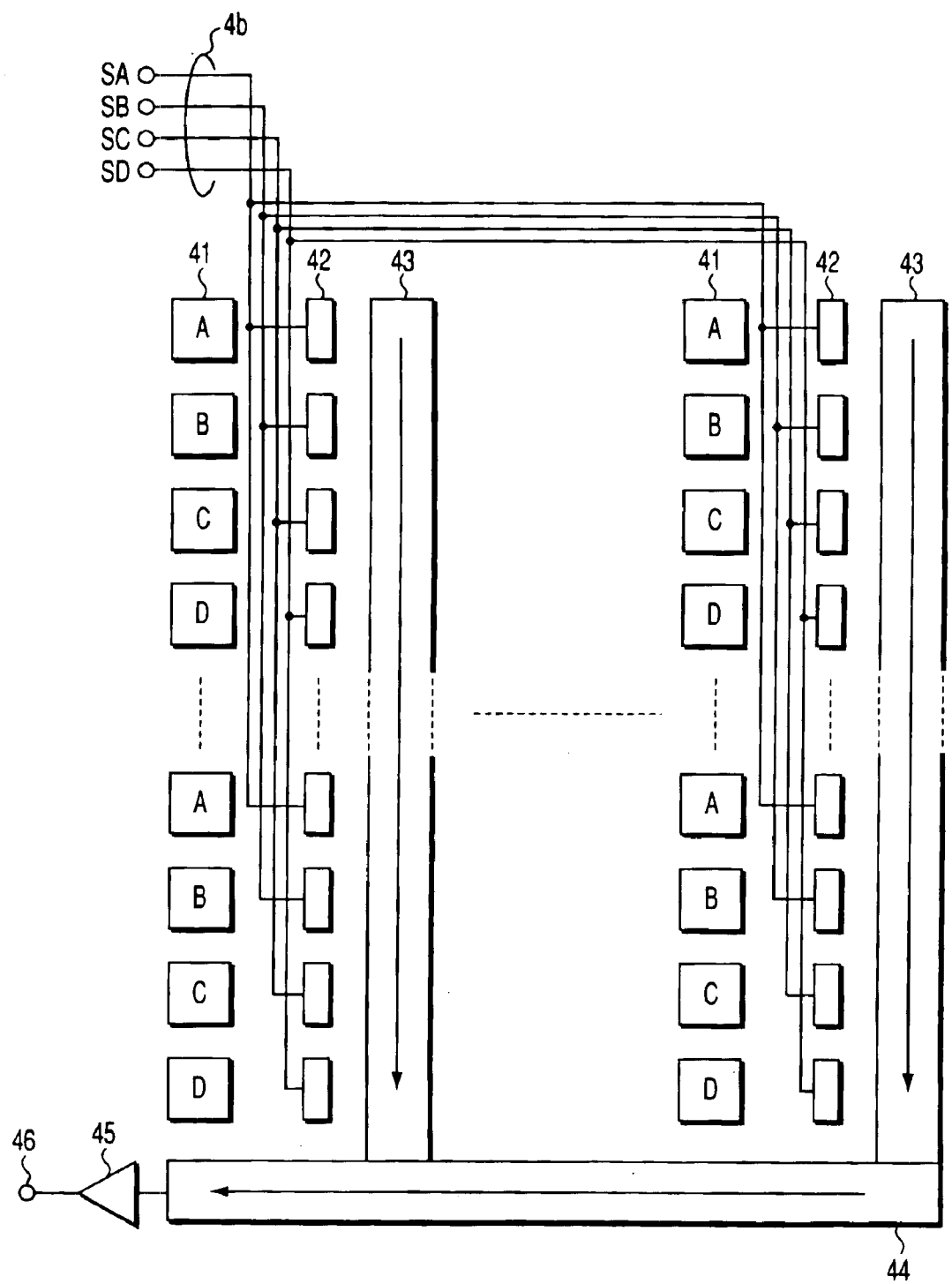
FIG. 2 schematically shows the configuration of a CCD in the embodiment.

FIG. 2 shows the configuration of the CCD 5 in the embodiment. The CCD 5, which is an interline transfer CCD, is composed of photodiodes 41 acting as photoelectric conversion elements and being arranged in an array two-dimensionally, transfer gates 42, a vertical transfer section 43, a horizontal transfer section 44, and an output amplifier 45.

The signal charges accumulated in the photodiodes 41 are transferred via the transfer gates 42 to the vertical transfer section 43 composed of CCDs. The vertical transfer section 43 transfers the signal charges vertically. Then, the signal charges are transferred horizontally by the horizontal transfer section 44 composed of CCDs as is the vertical transfer section 43. The output amplifier 45 connected to the output section of the horizontal transfer section 44 converts the signal charges into voltage signals and outputs it as an image signal at an output terminal 46.

The photodiodes 41 are divided into groups composed of lines spaced vertically at specific intervals. Specifically, of the lines spaced vertically at the specific intervals, the photodiodes 41 connected to the same line are treated as the same group. The photodiodes 41 belonging to the same group are controlled in the same manner to accumulate charges. The charge accumulation control will be explained later in detail.

FIG. 2 shows an example of the photodiodes 41 divided into four groups 41A, 41B, 41C, and 41D composed of combinations of every third line. In the figure, A, B, C, and D written in the boxes representing the photodiodes 41 indicate the photodiodes belonging to the groups 41A, 41B, 41C, and 41D.

The transfer gates are generally provided in such a manner that they are shared by a vertical line of photodiodes. The transfer gates 42 in the embodiment, however, have been formed separately in such a manner that they correspond to the photodiodes 41 on a one-to-one basis. Additionally, these transfer gates 42 are connected to common junction lines 4b in such a manner that they are divide into groups so as to correspond to the groups 41A, 41B, 41C, and 41D of the photodiodes 41 and are connected to the common junction lines 46 group by group. The CCD driver 17 of FIG. 1 supplies transfer pulses SA, SB, SC, and SD via the common junction lines 46.

The supplied transfer pulses SA, SB, SC, and SD perform control in such a manner that the photodiodes belonging to the same group start to accumulate the signal charges with the same timing and the photodiodes belonging to another group start to accumulate the signal charges with different timing (specifically, for example, the photodiodes belonging to the photodiode group 41A are controlled so as to start to accumulate the charges with the same timing. On the other hand, for example, the photodiodes belonging to the photodiode group 41A and those belonging to the photodiode group 41B are controlled in such a manner that the former start to accumulate the charges with different timing from that of the latter). Then, the image signal read from the photodiodes 41 via the transfer gate 42, vertical transfer section 43, horizontal transfer section 44, and output amplifier 45 is inputted to the AF processing section via the imaging circuit 6 and A/D converter 7.

In the AF processing section 14, the high-pass filter 31 extracts the high-frequency components from the image signals inputted from the A/D converter 7. Then, the high-frequency components corresponding to the photodiode groups 41A, 41B, 41C, and 41D are inputted via the switching device 32 to the accumulative add section 33, which calculates the accumulative add value for each high-frequency component as an AF evaluation value. On the basis of the AF evaluation value, the focus lens group 3 is moved via the CPU 15, second motor driver 19, and focus motor 22, thereby carrying out an AF operation.

Figure 3:
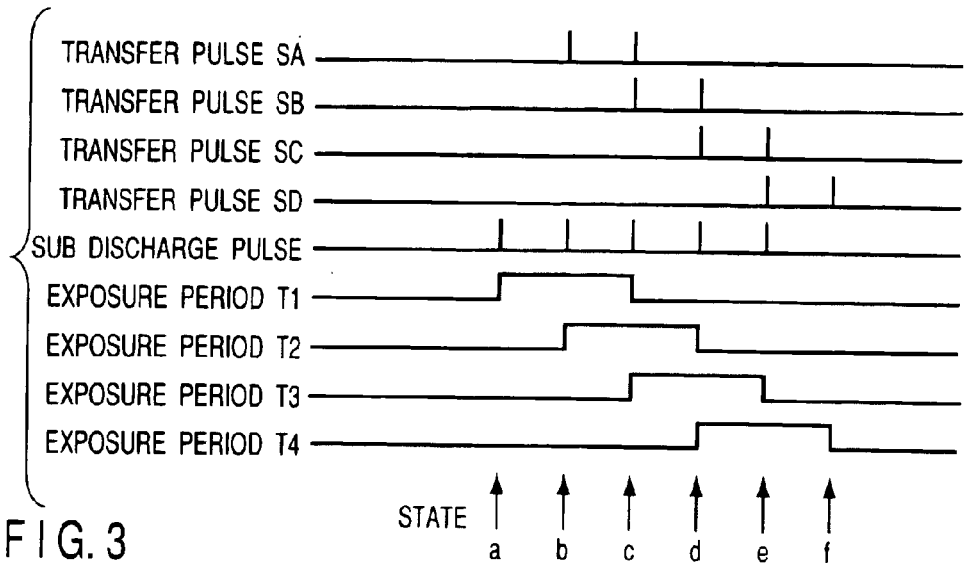
FIG. 3 is a timing chart to help explain the operation of the CCD in the embodiment.

FIG. 3 is a timing chart to help explain the accumulating/reading of the signal charges in the CCD 5. Specifically, FIG. 3 shows the transfer pulses SA, SB, SC, and SD, a SUB discharge pulse for sweeping away the signal charges accumulated in the photodiode 41 at a time, and the exposure time for each of the photodiode groups 41A, 41B, 41C, and 41D (the effective accumulation time of signal charges). In FIG. 3, states a, b, c, d, e, and f correspond to the timing of each of the states of the CCD of FIG. 4.

Figure 4:
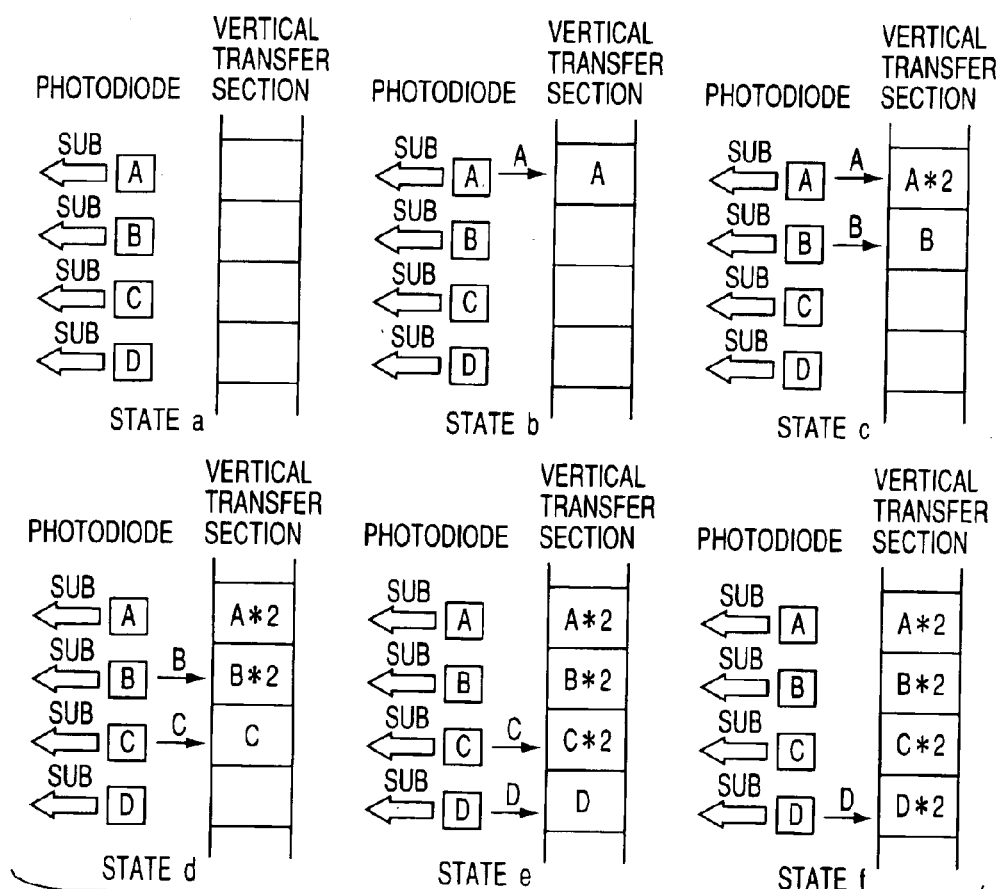
FIG. 4 is a pictorial diagram to help explain the internal operation of the CCD in the embodiment.

FIG. 4 pictorially shows each state of the internal operation of the CCD 5. In FIG. 4, symbols A, B, C, and D denote symbolically not only the groups to which the individual photodiodes 41 belong but also the signal charges accumulated in the photodiodes 41 and the amount of charge of the signal charges in the vertical transfer section 43.

Referring to FIGS. 3 and 4, a series of internal operations in the CCD 5 will be explained.

In state a in FIG. 4, each SUB discharge pulse sweeps away the signal charges accumulated in each of the photodiodes 41. Thereafter, in state b, transfer pulse SA enables the transfer gate 42 connected to the photodiode group 41A, causing the signal charges A accumulated in the photodiode group 41A to be transferred to the vertical transfer section 43. Immediately after that, the signal charges accumulated in all the photodiodes 41 are swept away again by SUB discharge pulses.

Next, in state c, transfer pulses SA, SB enable the transfer gate 42 connected to the photodiode groups 41A, 41B, causing the signal charges A, B accumulated in the photodiode groups 41A, 41B to be transferred to the vertical transfer section 43. Immediately after that, the signal charges accumulated in all the photodiodes 41 are swept away again by SUB discharge pulses. At this time, because the signal charges A accumulated in the photodiode group 41A are transferred to the vertical transfer section 43 twice in state b and state c, they have twice the amount of charge, that is, A*2, in the vertical transfer section 43. Specifically, the exposure period of the photodiode group 41A is T1 in FIG. 3, which is twice the period of the SUB discharge pulses.

Next, in state d, transfer pulses SB, SC enable the transfer gate 42 connected to the photodiode groups 41B, 41C, causing the signal charges B, C accumulated in the photodiode groups 418, 41C to be transferred to the vertical transfer section 43. Immediately after that, the signal charges accumulated in all the photodiodes 41 are swept away again by SUB discharge pulses.

At this time, because the signal charges B accumulated in the photodiode group 41B are transferred to the vertical transfer section 43 twice in state c and state d, they have twice the amount of charge in the vertical transfer section 43. Thus, the exposure period of the photodiode group 41B is T2 in FIG. 3. As shown in FIG. 3, the first half of the exposure period T2 overlaps with the second half of the exposure period T1.

Following that, the same operation is carried out in state e and state f, too. As a result, the signal charges in the vertical transfer section 43 in state f have twice the amount of charge of the signal charges accumulated in each of the photodiode groups 41A, 41B, 41C, and 41D. This means that the photodiode groups 41A, 41B, 41C, and 41D have been exposed over the periods T1, T2, T3, and T4 overlapping with each other by a half period.

As described above, in the embodiment, the photodiodes 41 in the CCD 5 are divided into the photodiode groups 41A, 41B, 41C, and 41D, which are each caused to start to accumulate the signal charges with different timing.

Therefore, as explained below, when each of the photodiode groups 41A, 41B, 41C, and 41D is caused to start to accumulate the signal charges, while the focus lens group 3 is being moved along the optical axis, information on errors in the focal point of the focus lens group 3 at different positions can be obtained on the basis of the image signal read from each of the photodiode groups 41A, 41B, 41C, and 41D. The focal error information at the different positions enables the in-focus position to be determined at high speed.

In addition, by so doing, the accumulation time of the signal charges in the photodiode groups 41A, 41B, 41C, and 41D is made shorter than that in a conventional AF system that acquires focal error information at lens positions from each screen of image signals. As described above, however, because the photodiode groups 41A, 41B, 41C, and 41D in the embodiment are exposed over the periods T1, T2, T3, and T4 overlapping with each other by half period, the charge accumulation time is relatively long. This compensates for a decrease in the level of the image signal read from each of the photodiode groups 41A, 41B, 41C, and 41D, which enables not only the focal error information to be sensed positively but also the AF evaluation value to be calculated reliably and the in-focus position to be determined with certainty.

Now, on the basis of the aforementioned operation of accumulating/reading charges in and from the CCD 5, specific embodiments of the AF operation will be explained.

EXAMPLE-1

Figure 5:
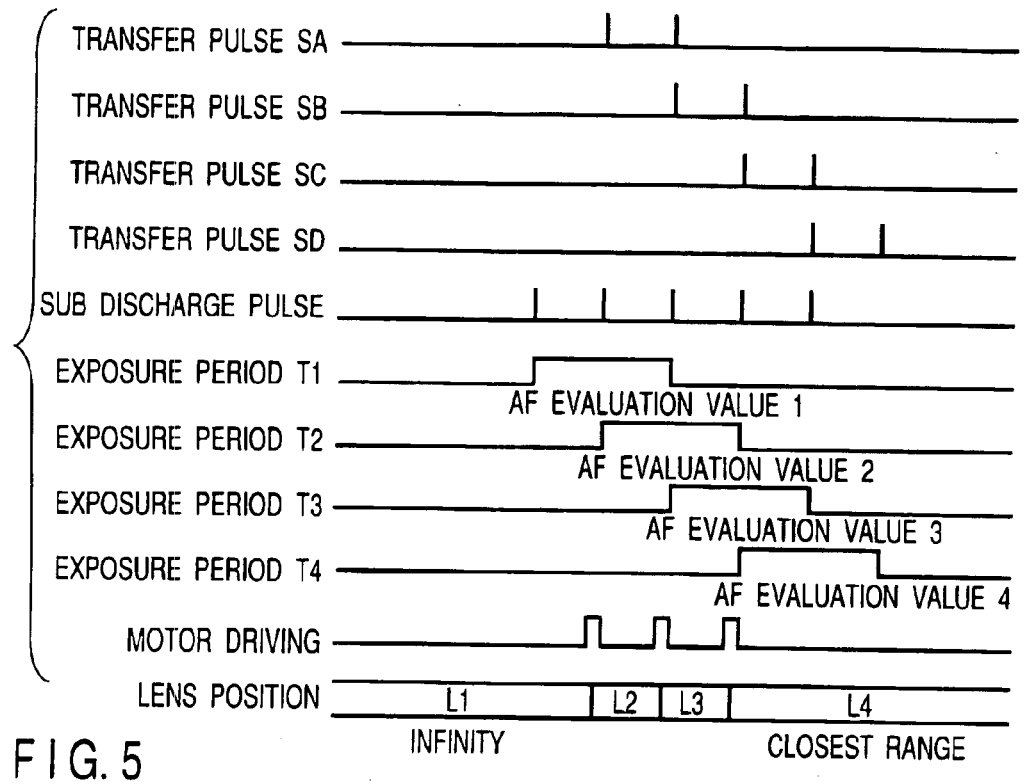
FIG. 5 is a timing chart to help explain an AF operation in the embodiment.

FIG. 5 is a timing chart to help explain an AF operation in a first embodiment of the present invention and the lens positions of the focus lens group 3 corresponding to the timing chart. It is assumed that the focus lens group 3 is a single-focal-point lens or a lens with a relatively short focal length and the amount of forward sliding (the movement along the optical axis) of the lens group 3 is relatively small and changes stepwise over three steps (four stop positions of the focus lens group 3). Transfer pulses SA, SB, SC, SD, and SUB discharge pulse and each exposure period are the same as those in FIG. 3.

As shown in the motor driving timing chart of FIG. 5, in an AF operation, the focus motor 22 is driven stepwise in synchronization with a first application of transfer pulses SA, SB, and SC. Interlocking with the driving, the focus lens group 3 moves from position L1 (infinity) and stops at positions L2, L3, and L4 (the closest range) in this order as shown in FIG. 5.

At this time, in the exposure periods T1, T2, T3, and T4, the accumulative add section 33 in the AF processing section 14 sets the accumulative add values of the high-frequency components of the image signals corresponding to the signal charges accumulated in the photodiode groups 41A, 41B, 41C, and 41D as the AF evaluation value 1, AF evaluation value 2, AF evaluation value 3, and AF evaluation value 4 corresponding to the lens positions L1, L2, L3, and L4, respectively.

On the basis of the relationship between the AF evaluation values 1, 2, 3, and 4, the CPU 15 determines the in-focus position. A method of determining the in-focus position in the first embodiment will be as follows:

AF evaluation value 1 is the largest→in-focus position= lens position L1.

AF evaluation values 1 and 2 are large (both are larger than AF evaluation values 3 and 4)→in-focus position= lens position L2.

AF evaluation values 2 and 3 are large (both are larger than AF evaluation values 1 and 4)→in-focus position=lens position L3.

AF evaluation value 4 is the largest→in-focus position=lens position L4.

After having determined the in-focus position, the CPU 15 fixes the focus lens group 3 at any one of the in-focus lens positions L1, L2, L3, and L4 and controls each section in such a manner that image pickup is effected in this state.

EXAMPLE-2

Figure 6:
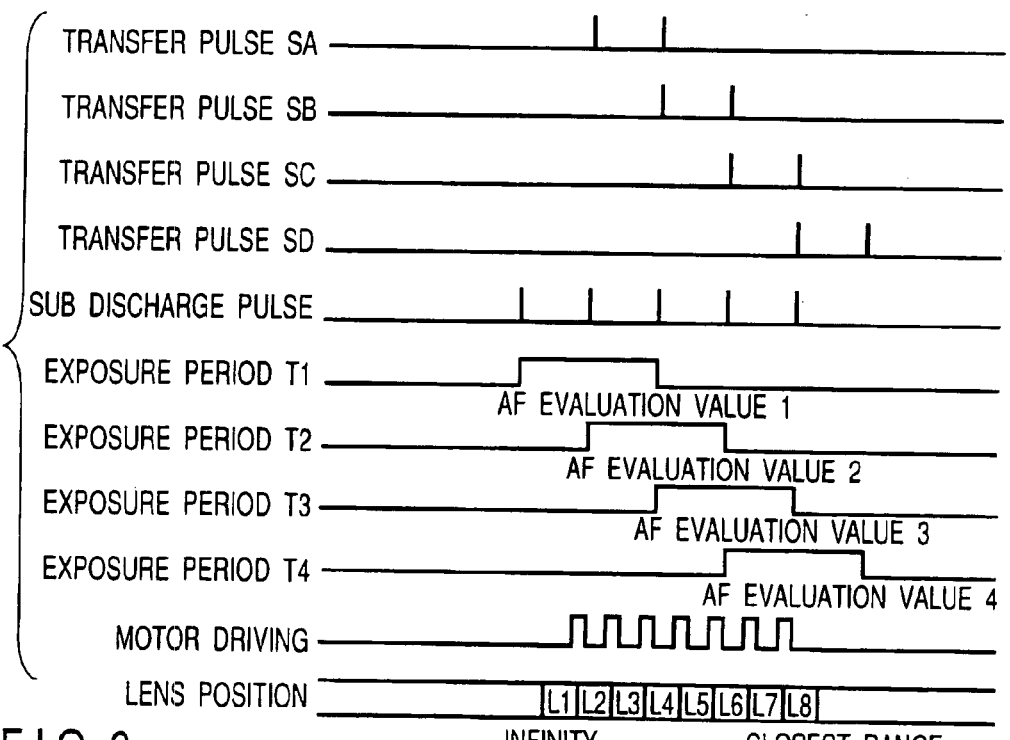
FIG. 6 is a timing chart to help explain another AF operation in the embodiment.

FIG. 6 is a timing chart to help explain an AF operation in a second embodiment of the present invention and the lens positions of the focus lens group 3 corresponding to the timing chart. In the second embodiment, it is assumed that the focus lens group 3 is a lens with a relatively long focal length and the amount of forward sliding of the lens group 3 is relatively large and changes stepwise over seven steps (eight stop positions of the focus lens group 3). Transfer pulses SA, SB, SC, SD, and SUB discharge pulse and each exposure period are the same as those in FIG. 3 or FIG. 5.

As shown in the motor driving timing chart of FIG. 6, the focus motor 22 is driven in two steps in synchronization with a first application of each of transfer pulses SA, SB, and SC. When the focus motor 22 is driven one step in synchronization with the first application of transfer pulse SD, the focus lens group 3 moves from position L1 (infinity) and stops at positions L2, L3, L4, L5, L6, L7, and L8 (the closest range) in this order as shown by the lens positions in FIG. 6.

At this time, in the exposure periods T1, T2, T3, and T4 of FIG. 6, the accumulative add section 33 in the AF processing section 14 sets the accumulative add values of the high-frequency components of the image signals corresponding to the signal charges accumulated in the photodiode groups 41A, 41B, 41C, and 41D as the AF evaluation value 1, AF evaluation value 2, AF evaluation value 3, and AF evaluation value 4 corresponding to the lens positions L1 to L3, L2 to L5, L4 to L7, and L6 to L8, respectively.

On the basis of the relationship between the AF evaluation values 1, 2, 3, and 4, the CPU 15 determines the in-focus position. A method of determining the in-focus position in the second embodiment will be as follows:

AF evaluation value 1 is the largest→in-focus position=lens position L1.

AF evaluation value 1>AF evaluation value 2>AF evaluation values 3, 4→in-focus edition lens position L2.

AF evaluation value 2>AF evaluation value 1>AF evaluation values 3, 4→in-focus position=lens position L3.

AF evaluation value 2>AF evaluation value 3>AF evaluation values 1, 4→in-focus position=lens position L4.

AF evaluation value 3>AF evaluation value 2>AF evaluation values 1, 4→in-focus position=lens position L5.

AF evaluation value 3>AF evaluation value 4>AF evaluation values 1, 2→in-focus position=lens position L6.

AF evaluation value 4>AF evaluation value 3>AF evaluation values 1, 2→in-focus position=lens position L7.

AF evaluation value 4 is the largest→in-focus position=lens position L8.

After having determined the in-focus position, the CPU 15 fixes the focus lens group 3 at any one of the in-focus lens positions L1, L2, L3, L4, L5, L6, L7, and L8 and controls each section in such a manner that image pickup is effected in this state.

EXAMPLE-3

Figure 7:
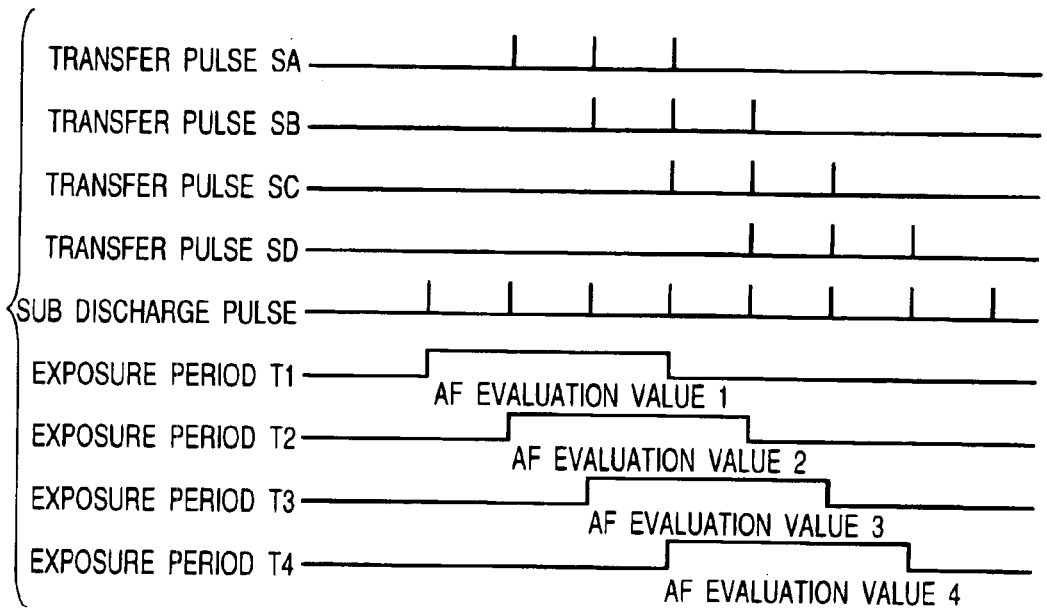
FIG. 7 is a timing chart to help explain still another AF operation in the embodiment.

FIG. 7 is a timing chart to help explain an AF operation in a third embodiment of the present invention. The third embodiment is suitable for a case where the brightness (illuminance) of the subject is relatively low.

Transfer pulses SA, SB, SC, and SD in FIG. 7 differ from those in the operation of the CCD 5 in FIGS. 3 and 4 or in the first and second embodiments in FIGS. 5 and 6. They are applied three times consecutively. Specifically, the signal charges accumulated in each of the photodiodes 41 in the CCD 5 are transferred three times to the vertical transfer section 43 via the transfer gate 42. Because the exposure periods T1, T2, T3, and T4 in FIG. 7 are 1.5 times as long as those in FIGS. 3 to 6, a sufficient amount of exposure is secured, even when the subject is dark. This assures highly reliable AF evaluation values 1, 2, 3, and 4.

A method of determining the in-focus position on the basis of the AF evaluation values 1, 2, 3, and 4 in the third embodiment may be the same as that in the first or second embodiment. Additionally, the period of transfer pulse application may be varied in more stages according to the brightness of the subject.

When the transfer pulse application period is varied according to the brightness of the subject (that is, when the transfer pulse application period is shortened for a bright subject and the transfer pulse application period is lengthened for a dark subject), it is possible to obtain image signals at the proper level that enables the processing at the AF processing section 14, regardless of the brightness of the subject, which enables a good AF operation, regardless of the brightness of the subject.

In commercially available camcorders, even when image data shifted several lines due to an unsteady hold on the camera is used, it has no adverse effect on the AF operation and performance. Since the NTSC camcorder is based on interlaced scanning, the field image data sequentially outputted is image data items shifted one line from each other. However, even when the image data items are outputted alternately in such a manner that they are shifted one line from each other, use of such image data items has no adverse effect on the AF operation and performance.

On the other hand, the AF operations explained in the first, second, and third embodiments have been executed on the basis of the image signals corresponding to the signal charges accumulated in the photodiode groups 41A, 41B, 41C, and 41D, respectively. The four photodiode groups 41A, 41B, 41C, and 41D have been obtained by dividing the photodiodes in such a manner that they are combined at intervals of three lines. Therefore, in the AF operation in each of the embodiments, the data for each of the combinations of lines sequentially outputted is used as shown below:

First output image (line 0, line 4, line 8, . . . , 4*line n).

Second output image (line 1, line 5, line 9, . . . , 4*line n).

Third output image (line 2, line 6, line 10, . . . , 4*line n).

Fourth output image (line 3, line 7, line 11, . . . , 4*line n).

Fifth output image (line 0, line 4, line 8, . . . , 4*line n).

This means that each image data item sequentially outputted is the data at another position.

Specifically, although in each of the above embodiments, the image data obtained by 4-line interlaced scanning has been used, there is no problem, provided that the CCD 5 has much higher picture-quality pixels than NTSC. In other worded in the embodiments, using high picture-quality pixels in the CCD 5 assures the same performance as that of NTSC.

Figure 8:
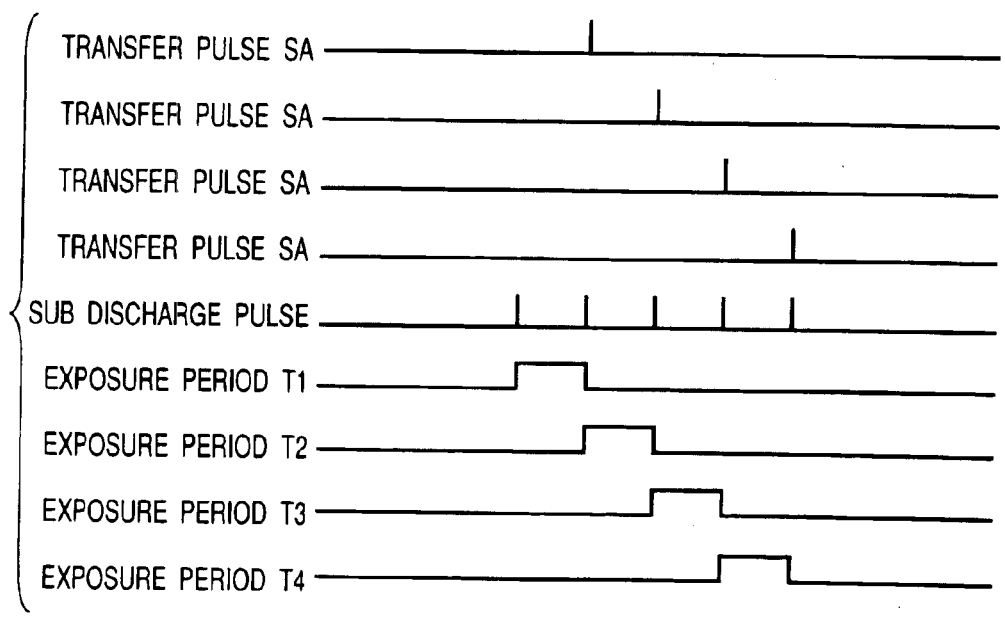
FIG. 8 is a timing chart to help explain still another AF operation in the embodiment.

Furthermore, in the AF operation in each of the embodiments, to gain the exposure (exposure time), the data for each of the combinations of lines sequentially outputted is read in such a manner that exposures overlap with each other. In contrast, although the exposure decreases, each data item may be read in such a manner that they do not overlap with each other as shown in FIG. 8.

Additional advantages and modifications will readily occur to those skilled in the art. Therefore, the present invention in its broader aspect is not limited to the specific details, representative devices, and illustrated examples shown and described herein. Accordingly, various modifications may be made without departing from the sprit or scope of the general inventive concept as defined by the appended claims and their equivalents.

What is claimed is:

1. An imaging apparatus comprising: a taking lens for forming an image of a subject on an imaging surface;

an imaging device which is constructed by arranging photoelectric conversion elements in a two-dimensional array and dividing them into photoelectric conversion element groups, composed of combinations of lines spaced at specific intervals, and which stores the charges corresponding to the image of the subject formed by said taking lens on the imaging surface;

control means for controlling the charge storage start timing for said imaging device in such a manner that the photoelectric conversion elements belonging to the same photoelectric conversion element group in said imaging device start to store charges with the same timing and the photoelectric conversion elements belonging to another photoelectric conversion element group start to store charges with different timing; and driving means for driving said taking lens along the optical axis on the basis of the image signal read from each of the photoelectric conversion element groups in said imaging device, wherein said driving means drives said taking lens to specific positions in synchronization with the charge storage start timing for each of the photoelectric conversion element groups in said imaging device.

2. An imaging apparatus comprising: a taking lens for forming an image of a subject on an imaging surface;

an imaging device which is constructed by arranging photoelectric conversion elements in a two-dimensional array and dividing them into photoelectric conversion element groups, composed of combinations of lines spaced at specific intervals, and which stores the charges corresponding to the image of the subject formed by said taking lens on the imaging surface;

control means for controlling the charge storage start timing for said imaging device in such a manner that the photoelectric conversion elements belonging to the same photoelectric conversion element group in said imaging device start to store charges with the same timing and the photoelectric conversion elements belonging to another photoelectric conversion element group start to store charges with different timing; and driving means for driving said taking lens along the optical axis on the basis of the image signal read from each of the photoelectric conversion element groups in said imaging device, wherein said driving means drives not only said taking lens to specific positions in synchronization with the charge storage start timing for each of the photoelectric conversion element groups in said imaging device but also said taking lens to an in-focus position on the basis of the result of comparing the high-frequency components of the image signals read from each of said photoelectric conversion element groups.

3. The imaging apparatus according to claim 2, wherein said driving means sets any one of said specific positions as said in-focus position and driving said taking lens to the in-focus position.

4. An imaging apparatus comprising: a taking lens for forming an image of a subject on an imaging surface;

an imaging device which is constructed by arranging photoelectric conversion elements in a two-dimensional array and dividing them into photoelectric conversion element groups, composed of combinations of lines spaced at specific intervals, and which stores the charges corresponding to the image of the subject formed by said taking lens on the imaging surface;

control means for controlling the charge storage start timing for said imaging device in such a manner that the photoelectric conversion elements belonging to the same photoelectric conversion element group in said imaging device start to store charges with the same timing and the photoelectric conversion elements belonging to another photoelectric conversion element group start to store charges with different timing; and driving means for driving said taking lens along the optical axis on the basis of the image signal read from each of the photoelectric conversion element groups in said imaging device, wherein:

said imaging device includes said photoelectric conversion elements, a vertical transfer section for transferring the charges stored in said photoelectric conversion elements vertically, a horizontal transfer section for transferring the charges from the vertical transfer section horizontally, and transfer gates provided between said photoelectric conversion elements and said vertical transfer section in such a manner that they correspond to the photoelectric conversion elements on a one-to-one basis to transfer the charges stored in said photoelectric conversion elements to said vertical transfer section, and said transfer gates transfer the charges stored in said photoelectric conversion elements to said vertical transfer section, when transfer pulses are applied to the transfer gates at specific intervals of time over a specific time beginning at the charge storage start of said photoelectric conversion elements.

5. The imaging apparatus according to claim 4, further comprising means for changing, according to the brightness of the subject, the period during which said transfer pulses are applied.

6. An imaging apparatus control method comprising:

the step of causing a taking lens to form an image of a subject formed by said taking lens on the imaging surface in such a manner that, in an imaging device which is constructed by arranging photoelectric conversion elements in a two-dimensional array and dividing them into photoelectric conversion element groups, the photoelectric conversion elements belonging to the same group start to store charges with the same timing and the photoelectric conversion elements belonging to another group start to store charges with different timing; and the step of driving said taking lens along the optical axis on the basis of the image signal read from each of said photoelectric conversion element groups, wherein said driving step drives said taking lens to specific positions in synchronization with the charge storage start timing for each of said photoelectric conversion element groups.

7. An imaging apparatus control method comprising:

the step of causing a taking lens to form an image of a subject formed by said taking lens on the imaging surface in such a manner that, in an imaging device which is constructed by arranging photoelectric conversion elements in a two-dimensional array and dividing them into photoelectric conversion element groups, the photoelectric conversion elements belonging to the same group start to store charges with the same timing and the photoelectric conversion elements belonging to another group start to store charges with different timing; and the step of driving said taking lens along the optical axis on the basis of the image signal read from each of said photoelectric conversion element groups, wherein said driving step drives not only said taking lens to specific positions in synchronization with the charge storage start timing for each of said photoelectric conversion element groups but also said taking lens to an in-focus position on the basis of the result of comparing the high-frequency components of the image signals read from each of said photoelectric conversion element groups after the storage.

8. An imaging apparatus control method comprising:

the step of causing a taking lens to form an image of a subject formed by said taking lens on the imaging surface in such a manner that, in an imaging device which is constructed by arranging photoelectric conversion elements in a two-dimensional array and dividing them into photoelectric conversion element groups, the photoelectric conversion elements belonging to the same group start to store charges with the same timing and the photoelectric conversion elements belonging to another group start to store charges with different timing; and the step of driving said taking lens along the optical axis on the basis of the image signal read from each of said photoelectric conversion element groups, wherein the step of storing the charges corresponding to the image of the subject formed by said taking lens on the imaging surface includes the step of storing charges in said photoelectric conversion elements, the step of causing transfer gates to transfer the charges stored in said photoelectric conversion elements to a vertical transfer section, when transfer pulses are applied to the transfer gates at specific intervals of time over a specific time beginning at the charge storage start of said photoelectric conversion elements, the step of causing a vertical transfer section to transfer the transferred charges vertically to a horizontal transfer section, and the step of transferring the charges from the vertical transfer section horizontally.

9. The imaging apparatus control method according to claim 8, wherein the step of transferring charges to said vertical transfer section changes, according to the brightness of the subject, said specific time during which said transfer pulses are applied.

10. The imaging apparatus control method according to claim 7, wherein, in said driving step, said in-focus position is any one of said specific positions.

* * * * *